(12) United States Patent
Wang et al.

(10) Patent No.: US 8,233,421 B2
(45) Date of Patent: Jul. 31, 2012

(54) METHOD FOR REDUCING TIMES OF RECEIVING OVERHEAD INFORMATION BY MOBILE MULTIMEDIA BROADCAST TERMINAL

(75) Inventors: Biao Wang, Shenzhen (CN); Hua Jiang, Shenzhen (CN); Xiaoguang Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 545 days.

(21) Appl. No.: 12/441,138

(22) PCT Filed: Dec. 30, 2006

(86) PCT No.: PCT/CN2006/003772
§ 371 (c)(1),
(2), (4) Date: Dec. 2, 2009

(87) PCT Pub. No.: WO2008/037142
PCT Pub. Date: Apr. 3, 2008

(65) Prior Publication Data
US 2010/0118757 A1    May 13, 2010

(30) Foreign Application Priority Data
Sep. 29, 2006   (CN) .......................... 2006 1 0140681

(51) Int. Cl.
*H04H 20/71*   (2008.01)
*H04M 1/00*   (2006.01)
(52) U.S. Cl. ........................................ 370/312; 455/574
(58) Field of Classification Search .................. None
See application file for complete search history.

(56) References Cited

U.S. PATENT DOCUMENTS
7,394,778 B2 *   7/2008   Kim .............................. 370/312
2003/0190937 A1 *   10/2003   Karmi et al. .................. 455/574

FOREIGN PATENT DOCUMENTS
| | | |
|---|---|---|
| CN | 1550079 A | 11/2004 |
| CN | 1960519 A | 5/2007 |
| EP | 0991288 A2 | 4/2000 |
| WO | 2005008937 A2 | 1/2005 |

OTHER PUBLICATIONS

International Search Report and Written Opinion in International Application No. PCT/CN2006/003772, dated Jul. 12, 2007.

* cited by examiner

*Primary Examiner* — John Blanton

(57) ABSTRACT

A method for reducing times of receiving overhead information by a mobile multimedia broadcast terminal, comprising the following steps: a mobile multimedia broadcast system multiplexes different services according to service type, generates different overhead information, and adds an overhead information update indication in a corresponding service data segment for indicating whether the overhead information in the next frame will be updated; a receiving terminal monitors whether the overhead information will be changed according to the overhead information update indication in the service data segment; when the overhead information update indication indicates the overhead information in the next frame will not be updated, the receiving terminal will not receive the overhead information and only receive necessary service data in the next frame; when the overhead information update indication indicates the overhead information in the next frame will be updated, the occurrence of the update will be recorded, and the receiving terminal will determine whether to read the updated overhead information according to whether it is necessary to receive other services other than the current service.

10 Claims, 3 Drawing Sheets

METHOD FOR REDUCING TIMES OF RECEIVING OVERHEAD INFORMATION BY MOBILE MULTIMEDIA BROADCAST TERMINAL

CROSS REFERENCE TO RELATED APPLICATIONS or PRIORITY CLAIM

This application is a national phase of International Application No. PCT/CN2006/003772, entitled "METHOD FOR REDUCING TIMES OF RECEIVING OVERHEAD INFORMATION BY MOBILE MULTIMEDIA BROADCAST TERMINAL", which was filed on Dec. 30, 2006, and which claims priority of Chinese Patent Application No. 200610140681.7 filed Sep. 29, 2006.

DESCRIPTION

1. Technical Field

The present invention relates to digital mobile communication field, and particularly to a method for designing overhead information for a mobile multimedia broadcast system.

1. Background of the Invention

In recent years, digital mobile multimedia broadcast technologies and standards have been developed, such as the DVB-H (Digital Video Broadcast Handheld) of Europe, and the MediaFLO (Media Forward Link Only) of the USA.

Compared with the analog technology, digital mobile multimedia broadcast network has an advantage that one broadcast channel can support multiple services transmission via multiplexing under the precondition that the QoS (Quality of Service) demand is satisfied, thereby improving the utilization ratio of radio resource greatly. The code stream rendered by multiplexing multiple services is called broadcast code stream. For a receiving terminal, as there are multiple services within one broadcast code stream, in order to receive one or more necessary service quickly and accurately, the receiving terminal needs information which can describe the broadcast channel resource used by each service in present broadcast code stream accurately, and which is useful for the receiving terminal to receive the payload data of the necessary services quickly and accurately. As the above information does not belongs to the payload of the service, thus called overhead information.

In a mobile multimedia broadcast system, due to the importance of the overhead information, the mobile multimedia broadcast system generally needs better protective measures (for example, adopt channel encoding technologies having better receiving characteristics and low-level constellation mapping such as BPSK) for the overhead information; meanwhile, for the consideration of reducing the reception time of a mobile multimedia receiving terminal, the overhead information is usually transmitted separately from the data payload of various services.

In the mobile multimedia broadcast system, the broadcast code stream is usually multiplexed in time division mode, and the broadcast code streams within a certain time interval is called one frame, data in one frame comprise overhead information of this frame and data segments of various services, the overhead information is generated by the sending terminal of the network side during multiplexing and is transmitted at the starting time of the frame.

As the overhead information and the payload data of the service are transmitted separately, then how to ensure that the times of obtaining the overhead information are reduced and the changes of the overhead information are reported to the receiving terminal in time while the receiving terminal receives the necessary services, it is one of the key points for mobile multimedia broadcast system design.

SUMMARY OF THE INVENTION

The present invention aims to provide a method for reducing times of receiving overhead information of a mobile multimedia broadcast terminal, so that when a mobile multimedia broadcast system receiving terminal receives necessary service, the times for obtaining overhead information can be reduced while the changes of the overhead information can be reported to the receiving terminal in time, thereby saving power for the terminal.

In order to achieve the above purpose, the present invention adopts the following technical solution:

a method for reducing times of receiving overhead information by a mobile multimedia broadcast terminal, comprising the following steps:

(1) multiplexing different services according to service type, generating different overhead information, and adding an overhead information update indication in a corresponding service data segment for indicating whether the overhead information in the next frame will be updated, by a mobile multimedia broadcast system;

(2) sending initial overhead information to a receiving terminal first, and sending the overhead information update indication to the receiving terminal in advance when the overhead information needs to be updated, by a sending side of the mobile multimedia broadcast system; and (3) obtaining necessary service according to the initial overhead information received and monitoring whether the overhead information will change according to the overhead information update indication in the service data segment, by the receiving terminal.

Step (3) can further comprise: when the overhead information update indication indicates the overhead information in the next frame will not be updated, receiving the service data in necessary service data segments and the overhead information update indication in the next frame only; when the overhead information update indication indicates the overhead information in the next frame will be updated, recording the overhead information update indication, and determining whether to read the updated overhead information according to whether it is necessary to receive other services other than the current service, by the receiving terminal.

In step (3), the receiving terminal can cache the initial overhead information.

The above method can further comprise:

When it is necessary to receive other services other than the current service, querying whether an overhead information update indication is recorded, if there is no recorded overhead information update indication, using the stored overhead information to obtain the necessary service; if there is a recorded overhead information update indication, re-obtaining the current overhead information and obtaining the necessary service thereby, by the receiving terminal.

Furthermore, in step (3), once a definite overhead information update indication is monitored, stopping the monitoring and recording the occurrence of the update; in step (4), when the current overhead information is re-obtained, clearing the recorded occurrence of the update and re-monitoring the overhead information update indication.

According to the method of the present invention, the times for obtaining the overhead information of the receiving terminal can be reduced, thereby reducing the receiving time of the mobile multimedia receiving terminal, and meanwhile, the changes of the overhead information can be reported to the receiving terminal in time. The method can also reduce the complexity of the procession of the receiving terminal and uses less overhead information update indication, thus further reducing the receiving operation time of the receiving terminal of the mobile multimedia broadcast system and saving power for the terminal therewith.

DETAILED DESCRIPTION

The present invention aims to reduce the times for obtaining the overhead information of a receiving terminal while ensure that the change of the overhead information can be reported to the receiving terminal in time, so that the terminal can receive the updated information according to requirement. The specific embodiment is described as follows.

(1) in a mobile multimedia broadcast system, dividing the services into two types: continuous service, which will be sent continuously within a long period of time (measured by day, month or year); discrete service, which appears only in a short period of time (measured by second, minute or hour).

(2) at the sending side of the mobile multimedia broadcast system, sending service type information to notify the receiving terminal of the service type of each service (continuous service, discrete service), and there are many methods to notify the service type, for example, the service type information can be added in the overhead information for each service.

(3) generating different overhead information respectively according to the continuous service and the discrete service during multiplexing, wherein the overhead information includes continuous service overhead information and discrete service overhead information.

(4) adding overhead information update indication into various service data during multiplexing, the overhead information update indication used to indicate whether the overhead information in the next frame will be updated, and the overhead information update indication can be monitored when the necessary service data is received by the receiving terminal.

(5) when the overhead information update indication indicates the overhead information in the next frame will not be updated, the receiving terminal does not need to read the overhead information and only needs to receive the necessary service data (including auxiliary overhead information) in the next frame.

(6) when the overhead information update indication indicates the overhead information in the next frame will be updated, the receiving terminal will determine when to read the updated overhead information according to its state.

The following is a detailed description of the present invention in conjunction with the accompanying drawings.

Figure 1:
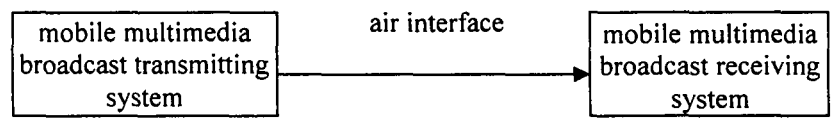
FIG. 1 is a configuration schematic view of the mobile multimedia broadcast system.

FIG. 1 is a configuration schematic view of a mobile multimedia broadcast system. The mobile multimedia broadcast network system is mainly composed of a mobile multimedia broadcast transmitting system and a mobile multimedia broadcast receiving system (terminal), the interface between the above two is a radio air interface, and the mobile multimedia broadcast service is sent from the transmitting system to a mobile multimedia broadcast receiving system in the manner of electromagnetic signal via the air interface.

Figure 2:
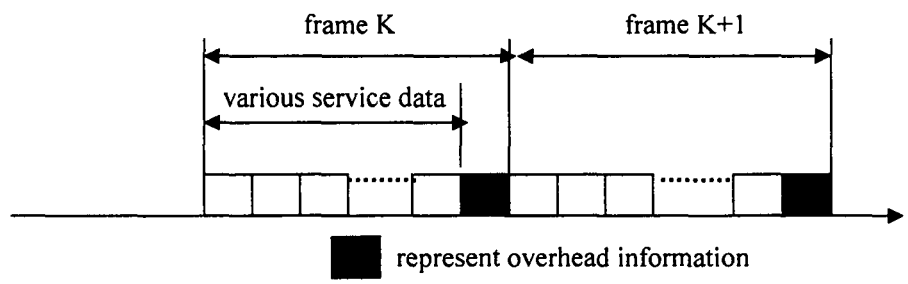
FIG. 2 is a frame structure schematic view of the broadcast code stream of the mobile multimedia broadcast system.

FIG. 2 is a frame structure schematic view of the broadcast code stream in the mobile multimedia broadcast system. The mobile multimedia broadcast network system provides the receiving terminal with a multiplexed broadcast stream, and within one frame of one broadcast code stream, the overhead information is located prior to each service data segment.

Figure 3:
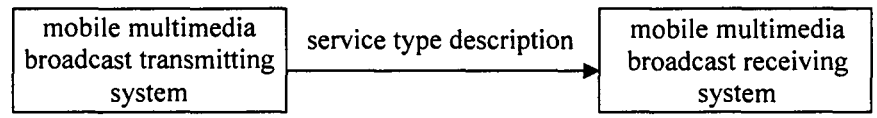
FIG. 3 is a view of the process of notifying the service type.

FIG. 3 is a view of the process of notifying the service type. In the mobile multimedia broadcast network system, the service type description of each service is sent from the mobile multimedia broadcast transmitting system to the receiving terminal.

Figure 4:
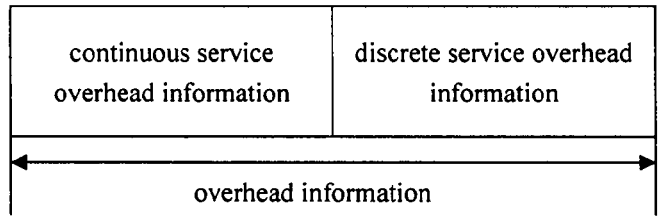
FIG. 4 is a configuration schematic view of the overhead information.

FIG. 4 is a configuration schematic view of the overhead information. The overhead information includes continuous service overhead information and discrete service overhead information.

Figure 5:
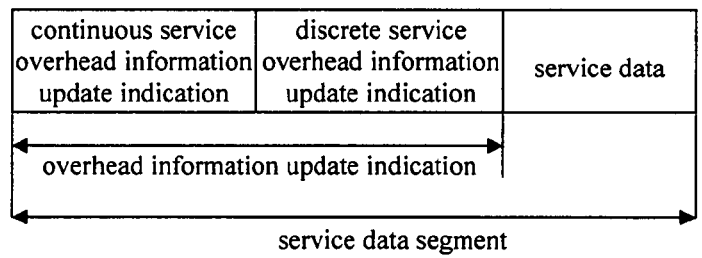
FIG. 5 is a configuration schematic view of the service data segment.

FIG. 5 is a configuration schematic view of the service data segment. The service data segment comprises service data and the overhead information update indication.

Figure 6:
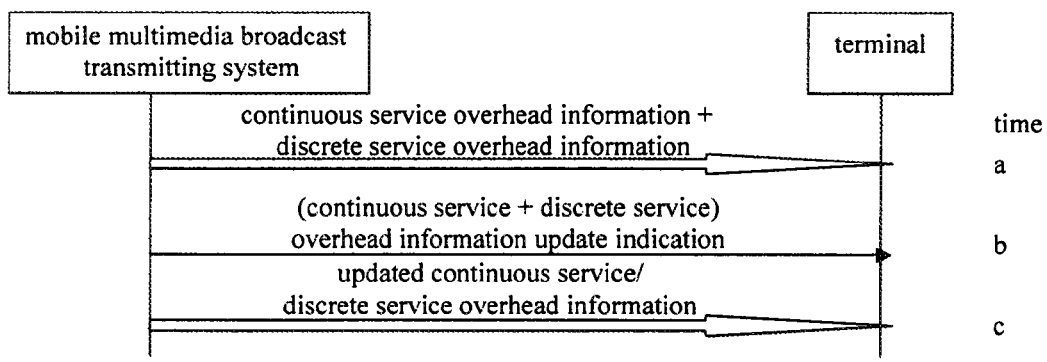
FIG. 6 illustrates the flow of sending the updated overhead information and the overhead information update indication.

FIG. 6 illustrates the flow of sending the updated overhead information and the overhead information update indication. The updated overhead information and the overhead information update indication provided to the receiving terminal by the mobile multimedia broadcast network system are sent from the mobile multimedia broadcast transmitting system to the receiving terminal, and the flow is as follows:

flow a: the mobile multimedia broadcast transmitting system sending initial overhead information;

flow b: the mobile multimedia broadcast transmitting system sends "overhead information update indication" to the receiving terminal one frame in advance; and flow c: the mobile multimedia broadcast system starts to send the updated overhead information to the receiving terminal in the next frame.

Figure 7:
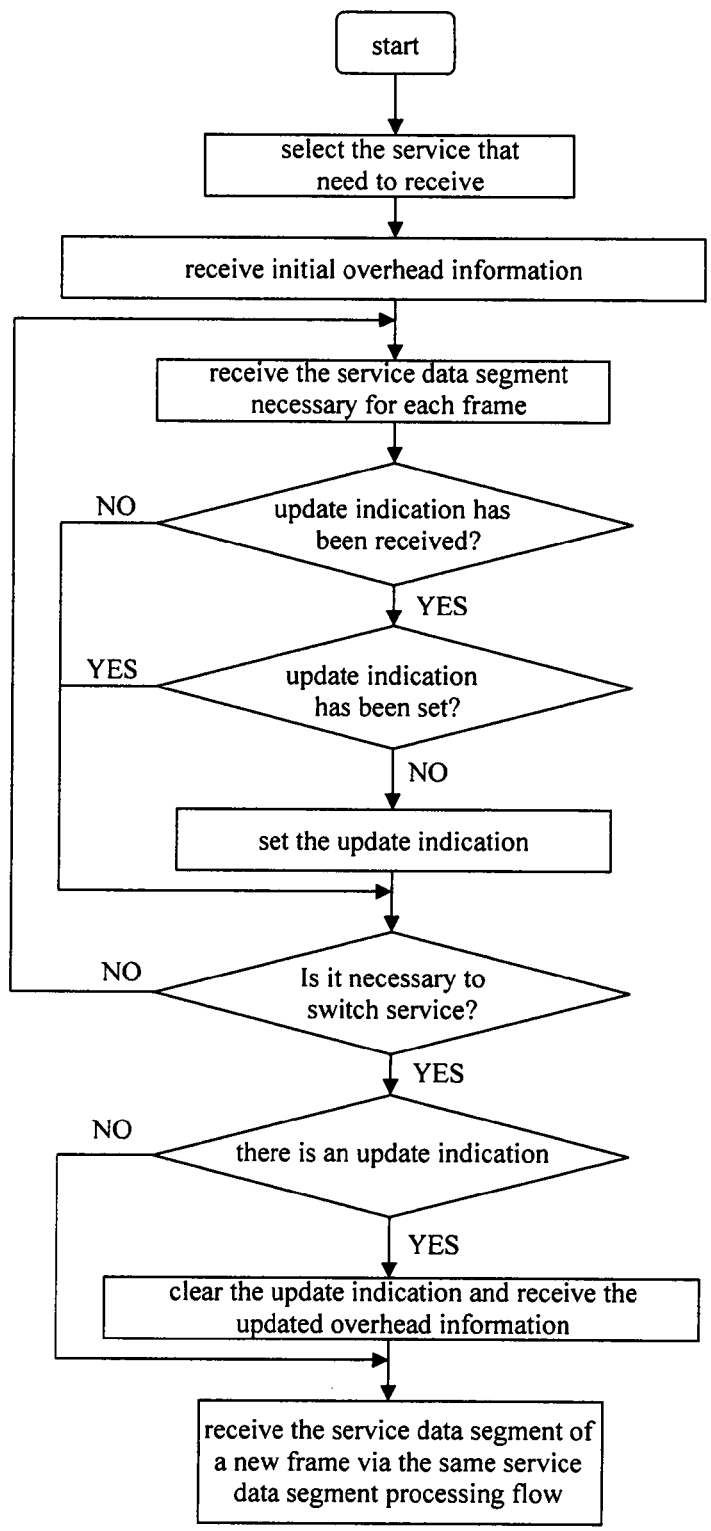
FIG. 7 is a flow of processing the overhead information and the overhead information update indication when the receiving terminal uses the continuous service.

FIG. 7 is a flow of processing the overhead information and the overhead information update indication during the reception of the continuous service. After power on, the mobile multimedia broadcast receiving terminal needs to receive the initial overhead information to obtain necessary services; when receiving the continuous mobile multimedia broadcast service, the receiving terminal needs to process the overhead information update indication when processing the service data segment of each frame, and monitors whether the overhead information will be updated based on the overhead information update indication; when the overhead information update indication indicates that the overhead information in the next frame will not be updated, the receiving terminal does not need to read the overhead information in the next frame, and just receives the necessary service data and auxiliary overhead information (being the overhead information update indication in the present embodiment); when the overhead information update indication indicates that the overhead information in the next frame will be updated, the overhead information update indication (representing that the overhead information is changed and needs to be updated) will be recorded, the overhead information update indication within the service data segment will not be processed until the receiving terminal turns to receive other services. When the receiving terminal desires to receive other services, if it has cached the initial overhead information and no overhead information update indication has been recorded, the receiving terminal only needs to use the stored overhead information, and not need to receive the overhead information again; if the initial overhead information has not been cached, or there is a recorded overhead information update indication, then the receiving terminal needs to receive the overhead information again, clears the previously recorded overhead information update indication, and starts to process and monitor the overhead information update indication again.

It will be apparent to those skilled in the art that various modification and variations can be made in the present invention. Thus, it is intended that the present invention covers the modifications and variations of this invention proved they come within the scope of the appended claims and their equivalents.

What is claimed is:

1. A method for reducing times of receiving overhead information by a mobile multimedia broadcast terminal, comprising the following steps:
   (1) multiplexing different services according to service type, generating different overhead information, and adding an overhead information update indication in a corresponding service data segment for indicating whether the overhead information in a next frame will be updated, by a mobile multimedia broadcast system;
   (2) sending initial overhead information to a receiving terminal first, and sending the overhead information update indication to the receiving terminal in advance when the overhead information needs to be updated, by a sending side of the mobile multimedia broadcast system; and
   (3) obtaining necessary service according to the initial overhead information received and monitoring whether the overhead information will be changed according to the overhead information update indication in the service data segment, by the receiving terminal.

2. The method according to claim 1, wherein, in step (1), further notifying the receiving terminal of the service type of each service by sending a service type notification, by the mobile multimedia broadcast system.

3. The method according to claim 2, wherein, the service type notification is achieved by adding service type information in the overhead information.

4. The method according to claim 1, wherein, the service type comprises continuous service and discrete service.

5. The method according to claim 4, wherein, continuous service overhead information and discrete service overhead information are generated respectively according to the continuous service and the discrete service during multiplexing.

6. The method according to claim 1, wherein, in step (2), when the overhead information needs to be updated, sending the overhead information update indication to the receiving terminal one frame in advance, by the sending side of the mobile multimedia broadcast system.

7. The method according to claim 1, wherein, step (3) further comprises: when the overhead information update indication indicates the overhead information in the next frame will not be updated, receiving the service data in necessary service data segments and the overhead information update indication in the next frame only; when the overhead information update indication indicates the overhead information in the next frame will be updated, recording the overhead information update indication, and determining whether to read the updated overhead information according to whether it is necessary to receive other services other than the current service, by the receiving terminal.

8. The method according to claim 7, wherein, step (3) further comprises: caching the initial overhead information by the receiving terminal.

9. The method according to claim 8, wherein further comprising step (4), in which when it is necessary to receive other services other than the current service, querying whether an overhead information update indication is recorded, if there is no recorded overhead information update indication, using the stored overhead information to obtain the necessary service; if there is a recorded overhead information update indication, re-obtaining the current overhead information and obtaining the necessary service thereby, by the receiving terminal.

10. The method according to claim 9, wherein,
   step (3) further comprises: once a definite overhead information update indication is monitored, stopping monitoring, and recording the occurrence of the update; and
   step (4) further comprises: when the current overhead information is re-obtained, clearing the recorded occurrence of the update and re-monitoring the overhead information update indication.

* * * * *